(12) United States Patent
Shi

(10) Patent No.: US 11,297,300 B2
(45) Date of Patent: Apr. 5, 2022

(54) ROBUST STRUCTURED-LIGHT PATTERNS FOR 3D CAMERA SYSTEM

(71) Applicant: Samsung Electronics Co., Ltd., Suwon-si (KR)

(72) Inventor: Lilong Shi, Pasadena, CA (US)

(73) Assignee: SAMSUNG ELECTRONICS CO., LTD.

( * ) Notice: Subject to any disclaimer, the term of this patent is extended or adjusted under 35 U.S.C. 154(b) by 166 days.

(21) Appl. No.: 15/928,081

(22) Filed: Mar. 21, 2018

(65) Prior Publication Data

US 2019/0238823 A1 Aug. 1, 2019

Related U.S. Application Data

(60) Provisional application No. 62/623,527, filed on Jan. 29, 2018.

(51) Int. Cl.
| | |
|---|---|
| *H04N 13/271* | (2018.01) |
| *G01B 11/25* | (2006.01) |
| *H04N 13/254* | (2018.01) |
| *H04N 13/239* | (2018.01) |

(52) U.S. Cl.
CPC ....... *H04N 13/271* (2018.05); *G01B 11/2513* (2013.01); *H04N 13/239* (2018.05); *H04N 13/254* (2018.05)

(58) Field of Classification Search
CPC .............. G01B 11/2513; G01B 11/254; G01B 11/2545; G06T 7/50; H04N 13/254; H04N 13/271
USPC ........................................................ 348/136
See application file for complete search history.

(56) References Cited

U.S. PATENT DOCUMENTS

| | | |
|---|---|---|
| 5,867,250 A | 2/1999 | Baron |
| 6,549,288 B1 | 4/2003 | Migdal et al. |
| 7,448,009 B2 | 11/2008 | Pundoor |
| 7,496,867 B2 | 2/2009 | Turner et al. |

(Continued)

OTHER PUBLICATIONS

Geng, Jason, "Structured-light 3D surface imaging: a tutorial", Advances in Optics and Photonics 3, 128-160 (2011), IEEE Intelligent Transportation System Society, Rockville Maryland 20852, USA.

(Continued)

*Primary Examiner* — Kathleen V Nguyen
(74) *Attorney, Agent, or Firm* — Renaissance IP Law Group LLP

(57) ABSTRACT

A structured-light pattern for a structured-light system includes a base light pattern having a row of a plurality of sub-patterns extending in a first direction. Each sub-pattern is adjacent to at least one other sub-pattern. Each sub-pattern is different from each other sub-pattern. Each sub-pattern includes n dots in a sub-row and n dots in a sub-column in which n is an integer. Each dot is substantially a same size. Each sub-row extends in the first direction, and each sub-column extends in a second direction that is substantially orthogonal to the first direction. The dots that are aligned in a sub-column are offset in the second direction from the dots of the base light pattern that are aligned in an adjacent sub-column. In one embodiment, a size of each sub-pattern in the second direction is larger than a size of each sub-pattern in the first direction by a stretching factor.

14 Claims, 9 Drawing Sheets

(56) References Cited

U.S. PATENT DOCUMENTS

| | | | |
|---|---|---|---|
| 7,684,052 B2 | 3/2010 | Suwa et al. | |
| 7,849,422 B2 | 12/2010 | Sferrazza | |
| 7,930,674 B2 | 4/2011 | Parker et al. | |
| 8,538,166 B2 | 9/2013 | Gordon et al. | |
| 9,501,833 B2 | 11/2016 | Gordon et al. | |
| 9,635,339 B2 | 4/2017 | Campbell et al. | |
| 9,712,806 B2 | 7/2017 | Olmstead | |
| 9,769,454 B2 | 9/2017 | Visentini et al. | |
| 2006/0126958 A1 | 6/2006 | Kang | |
| 2008/0037044 A1 | 2/2008 | Tse et al. | |
| 2012/0154607 A1* | 6/2012 | Moed | G06K 7/10722 348/207.1 |
| 2014/0120319 A1 | 5/2014 | Joseph | |
| 2015/0138078 A1 | 5/2015 | Krupka et al. | |
| 2015/0371394 A1* | 12/2015 | Visentini | H04N 13/161 382/154 |
| 2016/0163031 A1 | 6/2016 | Gordon et al. | |
| 2016/0335778 A1 | 11/2016 | Smits | |
| 2018/0101962 A1* | 4/2018 | Takizawa | H04N 9/3194 |
| 2018/0210313 A1* | 7/2018 | Weaver | G02F 1/015 |

OTHER PUBLICATIONS

Office Action for U.S. Appl. No. 15/907,242, dated Dec. 13, 2019.
Office Action for U.S. Appl. No. 16/003,014, dated Feb. 26, 2020.
Notice of Allowance for U.S. Appl. No. 15/907,242, dated Mar. 25, 2020.
Final Office Action for U.S. Appl. No. 16/003,014, dated Jul. 10, 2020.
Office Action for U.S. Appl. No. 16/003,014, dated Dec. 10, 2020.
Notice of Allowance for U.S. Appl. No. 16/003,014, dated May 5, 2021.
Corrected Notice of Allowance for U.S. Appl. No. 16/003,014, dated Sep. 23, 2021.
Corrected Notice of Allowability for U.S. Appl. No. 16/003,014, dated Oct. 26, 2021.
Corrected Notice of Allowability for U.S. Appl. No. 16/003,014, dated Dec. 9, 2021.
Office Action for U.S. Appl. No. 16/851,093, dated Dec. 30, 2021.

* cited by examiner

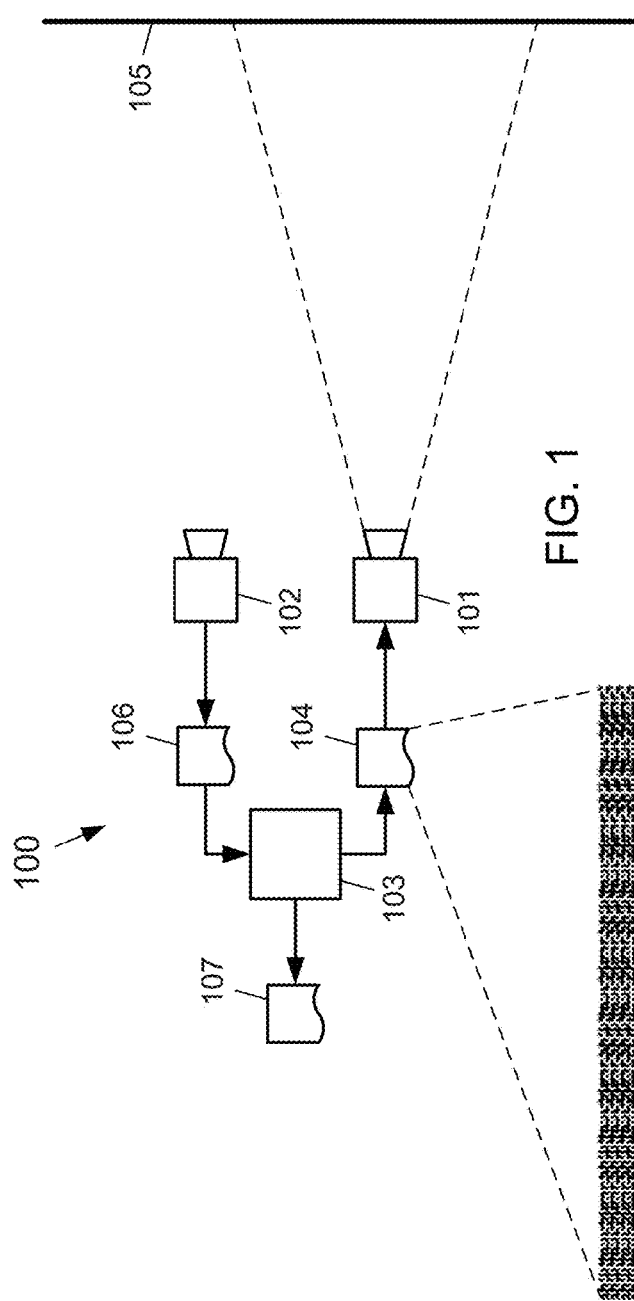
FIG. 1
FIG. 1A
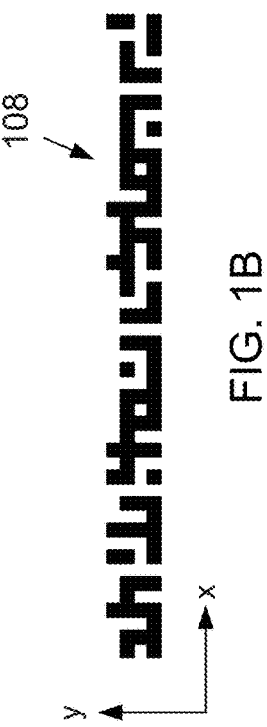
FIG. 1B

ROBUST STRUCTURED-LIGHT PATTERNS FOR 3D CAMERA SYSTEM

CROSS-REFERENCE TO RELATED APPLICATION

This patent application claims the priority benefit under 35 U.S.C. § 119(e) of U.S. Provisional Patent Application No. 62/623,527, filed on Jan. 29, 2018, the disclosure of which is incorporated herein by reference in its entirety.

TECHNICAL FIELD

The subject matter disclosed herein generally relates to three-dimensional (3D) camera systems and, more particularly, to a structured light pattern for a 3D camera system.

BACKGROUND

A widely used technique for estimating depth values in structured-light 3D camera systems, also referred to as stereo-camera systems, is by searching for the best match of a patch in the image to a patch in a reference pattern. To reduce the overall computational burden of such a search, the image patch is assumed to be in a near horizontal neighborhood of the reference pattern. Also, the reference pattern may be designed so that there is only a finite set of unique sub-patterns, which are repeated horizontally and vertically to fill in the entire projection space, which further simplifies the search process. The known arrangement of the unique sub-patterns in the reference pattern is used to identify the "class" of an image patch and, in turn, determine the disparity between the image patch and the reference patch. The image patch is also assumed to be centered at a depth pixel location, which also simplifies the calculation of the depth estimation.

SUMMARY

An example embodiment provides a structured-light pattern for a structured-light system that may include a base light pattern that may include a row of a plurality of sub-patterns extending in a first direction in which each sub-pattern may be adjacent to at least one other sub-pattern, each sub-pattern may be different from each other sub-pattern, each sub-pattern may include n dots in a sub-row and n dots in a sub-column in which n is an integer, each dot may include substantially a same size, each sub-row may extend in the first direction and each sub-column may extend in a second direction that may be substantially orthogonal to the first direction, and the structured-light pattern may further include the dots of the base light pattern that may be aligned in a sub-column may be offset in the second direction from the dots of the base light pattern that may be aligned in an adjacent sub-column.

Another example embodiment provides a structured-light pattern for a structured-light system that may include a base light pattern that may include a row of a plurality of sub-patterns extending in a first direction, each sub-pattern may be adjacent to at least one other sub-pattern, each sub-pattern may be different from each other sub-pattern, each sub-pattern may include n dots in a sub-row and n dots in a sub-column in which n is an integer, each dot may include substantially a same size, each sub-row may extend in the first direction and each sub-column may extend in a second direction that may be substantially orthogonal to the first direction, and a size of each sub-pattern of the base light pattern in the second direction may be larger than a size of each sub-pattern in the first direction by a stretching factor.

Still another example embodiment provides a structured-light pattern for a structured-light system that may include a base light pattern that may include a row of a plurality of sub-patterns extending in a first direction, each sub-pattern may be adjacent to at least one other sub-pattern, each sub-pattern may be different from each other sub-pattern, each sub-pattern may include n dots in a sub-row and n dots in a sub-column in which n is an integer, each dot may include substantially a same size, each sub-row may extend in the first direction and each sub-column may extend in a second direction that is substantially orthogonal to the first direction, the structured-light pattern may further include the dots of the base light pattern that may be aligned in a sub-column may be offset in the second direction from the dots of the base light pattern that may be aligned in an adjacent sub-column, and a size of each sub-pattern of the base light pattern in the second direction may be larger than a size of each sub-pattern in the first direction by a stretching factor.

BRIEF DESCRIPTION OF THE DRAWINGS

In the following section, the aspects of the subject matter disclosed herein will be described with reference to exemplary embodiments illustrated in the figures, in which:

FIG. 1 depicts a block diagram of an example embodiment of a structured-light system according to the subject matter disclosed herein;

FIG. 1A depicts an example embodiment of a typical reference light pattern;

FIG. 1B depicts an example embodiment of a base light pattern;

FIGS. 10A and 10B respectively depict an arrangement of example classification IDs for sub-patterns of a portion of a stretched reference light pattern and an arrangement of example classification IDs for sub-patterns of a portion of the reference light pattern that has been remapped and stretched to form a reference light pattern according to the subject matter disclosed herein.

DETAILED DESCRIPTION

Figure 2:
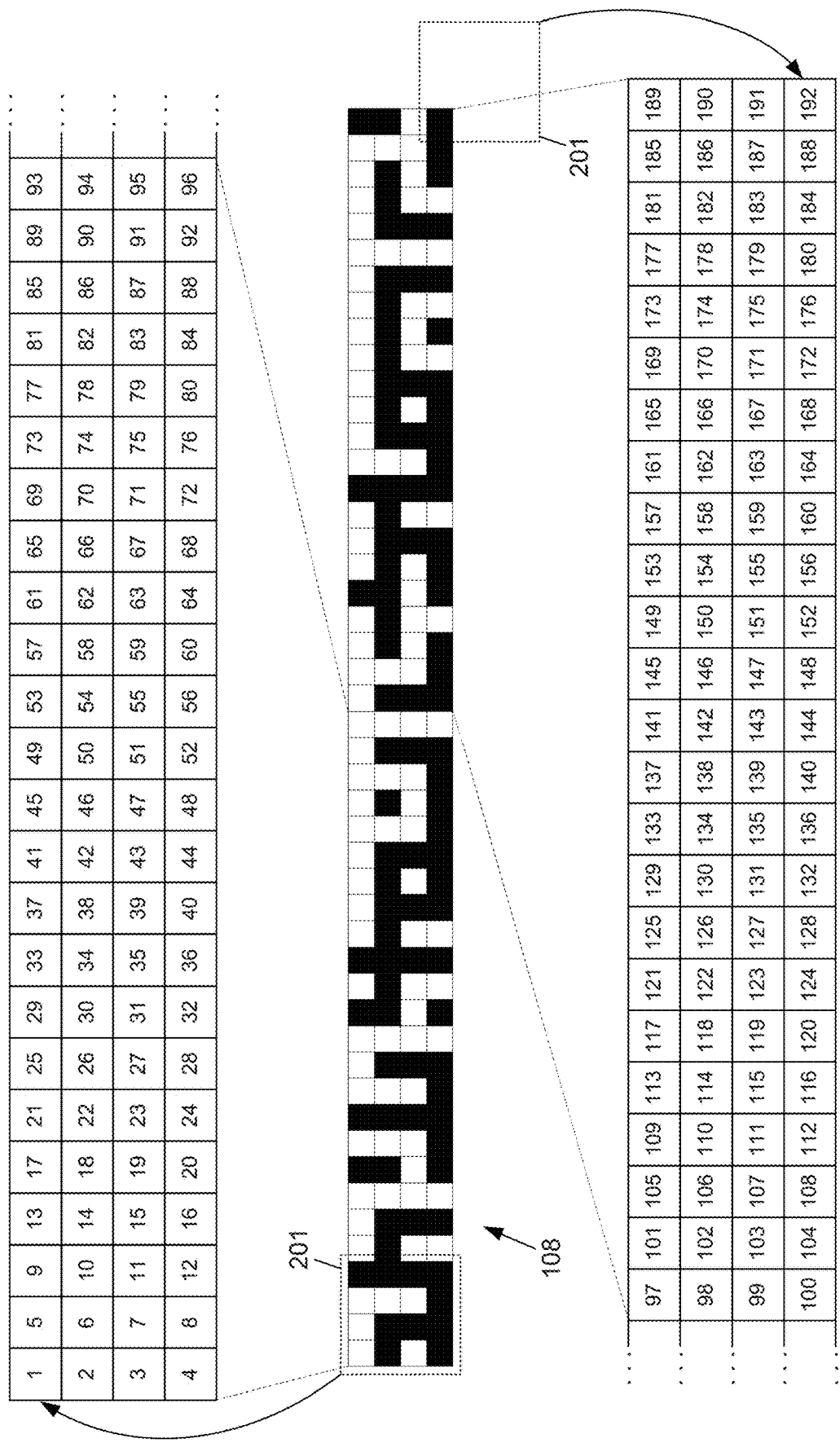
FIG. 2 depicts corresponding example classification identification numbers for the sub-patterns obtained by sliding a 4×4 pixel window over the base light pattern.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments disclosed herein provide a reference light pattern having remapped dots, as opposed to a rotated light pattern. The remapped dots may reduce the pixel sampling non-uniformity and relaxes the epipolar line restriction that is associated with identifying the "class" of an image patch. Additionally, the remapped dots of the reference light pattern provide a doubling of the maximum measurable disparity. Thus, a 3D image formed from a reference light pattern having remapped dots may be less noisy and more accurate. In one embodiment, the remapped dots of a reference light pattern may extend the shortest measurable distance (e.g., by 20%, 30%, 50% and/or the like).

In one embodiment, the dots of a reference light pattern may be stretched in a vertical direction to provide a depth estimation that is robust to epipolar line violation and improves system robustness to image distortion and non-uniformity of camera sampling. A trade-off may be that the depth image may have reduced vertical resolution. For example, sub-patterns in a center of the projected image may remain unstretched, while patterns located away from the center may be gradually stretched. The result may be full horizontal/vertical resolution around the center area of the 3D image, and a reduced vertical resolution towards the boundaries of the 3D image.

FIG. 1 depicts a block diagram of an example embodiment of a structured-light system 100 according to the subject matter disclosed herein. The structured-light system 100 includes a projector 101, a camera 102 and a processing device 103. In operation, the processing device 103 sends a reference light pattern 104 to the projector 101, and the projector 101 projects the reference light pattern 104 onto a scene or object that is represented by a line 105. The camera 102 captures the scene with the projected reference light pattern 104 as an image 106. The image 106 is transmitted to the processing device 103, and the processing device generates a depth map 107 based on a disparity of the reference light pattern as captured in the image 106 with respect to the reference light pattern 104. The depth map 107 includes estimated depth information corresponding to patches of the image 106.

The processing device 103 may be a microprocessor or a personal computer programed via software instructions, a dedicated integrated circuit or a combination of both. In one embodiment, the processing provided by processing device 103 may be implemented completely via software, via software accelerated by a graphics processing unit (GPU), a multicore system or by a dedicated hardware, which is able to implement the processing operations. Both hardware and software configurations may provide different stages of parallelism. One implementation of the structured-light system 100 may be part of a handheld device, such as, but not limited to, a smartphone, a cellphone or a digital camera.

In one embodiment, the projector 101 and the camera 102 may be matched in the visible region or in the infrared light spectrum, which may not visible to human eyes. The projected reference light pattern may be within the spectrum range of both the projector 101 and the camera 102. Additionally, the resolutions of the projector 101 and the camera 102 may be different. For example, the projector 101 may project the reference light pattern 104 in a video graphics array (VGA) resolution (e.g., 640×480 pixels), and the camera 102 may have a resolution that is higher (e.g., 1280×720 pixels). In such a configuration, the image 106 may be down-sampled and/or only the area illuminated by the projector 101 may be analyzed in order to generate the depth map 107.

FIG. 1A depicts an example embodiment of a typical reference light pattern 104. In one embodiment, the typical reference light pattern 104 may include a plurality of reference light-pattern elements that may be repeated in both horizontal and vertical direction to completely fill the reference light pattern 104. FIG. 1B depicts an example embodiment of a base light pattern 108 that is 48 dots wide in a horizontal direction (i.e., the x direction), and four dots high in a vertical direction (i.e., the y direction). Other base light patterns are possible. For simplicity, the ratio of dots to pixels may be 1:1, that is, each projected dot may be captured by exactly one pixel in a camera. In one embodiment, the typical reference light pattern 104 of FIG. 1A may be formed by repeating the base light pattern 108 ten times in the horizontal direction and 160 times in the vertical direction.

If a 4×4 pixel window is superimposed on the base light pattern 108 and slid horizontally (with wrapping at the edges), there will be 48 unique sub-patterns. If the 4×4 pixel window is slid vertically over the four pixels of the height of the base light pattern 108 (with wrapping) as the 4×4 pixel window is also slid horizontally, there will be a total of 192 unique sub-patterns. FIG. 2 depicts corresponding example classification identification numbers (IDs) for the 192 unique sub-patterns obtained by sliding a 4×4 pixel window over the base light pattern 108. Ninety-six of the classification IDs are indicated above the base light pattern 108, and 96 classification IDs are indicated below the base light pattern 108.

If, for example, a 4×4 pixel window 201 is located at the upper left of the base light pattern 108, the corresponding classification ID for the sub-pattern in the pixel window is 1. If 4×4 pixel window 201 is slid downward by one row, the corresponding classification ID for the sub-pattern in the pixel window is 2, and so on. If the 4×4 pixel window 201 is located at the lower right of the base light pattern 108, the corresponding classification ID for the sub-pattern in the pixel window is 192. Other classification IDs are possible.

To extend the maximum disparity of the typical reference light pattern 104, the light pattern 104 has been rotated. Such an approach, however, has a drawback because the projected light dots can no longer be sampled uniformly, resulting in an increase in mismatches between the reference light pattern and the captured image. For example, if a reference light pattern is rotated, the discretized centers of two rotated dots may be located substantially the same distance from the center of a sample pixel location. Determination then becomes difficult to identify which dot should be recognized as being the better of the two dots to be at the sample pixel location and may result in an incorrect classification ID for the sub-pattern. Such a situation may be referred to herein as a collision. Additionally, epipolar line assumptions must be restricted because of the increased mismatches between the rotated reference light pattern and the captured image. In order to reduce the number of mismatches if the reference light pattern has been rotated, a more precise distortion correction and alignment are required.

Instead of rotating the reference light pattern, one embodiment of the subject matter disclosed herein may shift, or remap, dots of each successive column of the base light pattern in a given horizontal direction downward by a predetermined amount across the horizontal width of the base light pattern. Another embodiment may shift dots of each successive column of the base light pattern in a given horizontal direction upward by a predetermined amount across the width of the base light pattern. A reference light pattern may be formed by repeating the base light pattern 108 having shifted, or remapped, dots ten times in the horizontal direction and 160 times in the vertical direction. A remapped reference light pattern reduces pixel sampling non-uniformity and relaxes epipolar line restrictions, thereby providing a resulting 3D image that is less noisy and more accurate than that provided by a reference light pattern that has been rotated.

In one embodiment, the dots of a column the base light pattern 108 may be remapped with respect to an adjacent column as $$\begin{pmatrix} x' \\ y' \end{pmatrix} = \begin{pmatrix} 1 & 0 \\ m & 1 \end{pmatrix} \begin{pmatrix} x \\ y \end{pmatrix},$$

in which x and y are the original coordinates of the dot in the base light pattern, x' and y' are the new coordinates of the shifted dot in the remapped base light pattern, and m is a shifting factor.

Figure 3:
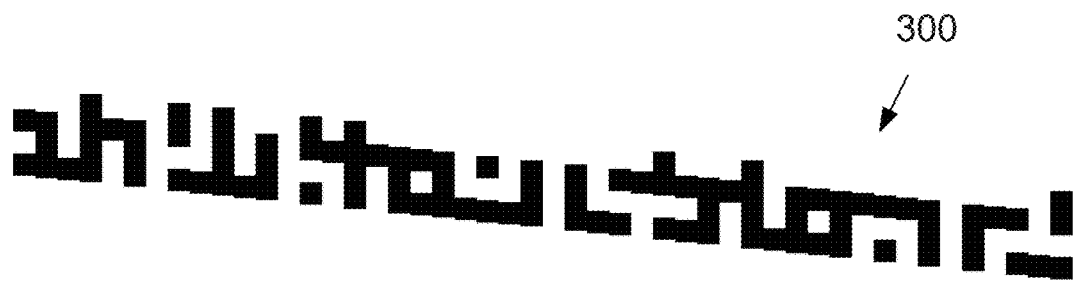
FIG. 3 depicts a base light pattern having dots that have been remapped based on a shifting factor m according to the subject matter disclosed herein.

FIG. 3 depicts a base light pattern 300 having dots that have been remapped based on a shifting factor m according to the subject matter disclosed herein. The base light pattern 300 has 48 dots wide in a horizontal direction (i.e., the x direction), and each column is four dots high in a vertical direction (i.e., the y direction) and in which each column of dots has been remapped by a shifting factor m with respect to the column of dot immediately to the left. In the example depicted in FIG. 3, the shifting factor m is 10%. That is, the dots of each column have been shifted downward from the column immediately to the left by 10%. Other shifting factors may be used. For simplicity, the ratio of dots to pixels may be 1:1 so that each projected dot may be captured by exactly one pixel in a camera. Although the columns in FIG. 3 have been shifted downward with respect to a column immediately to the left, the columns may alternatively be shifted upward with respect to a column immediately to the left (if, for example, m<0).

Figure 4:
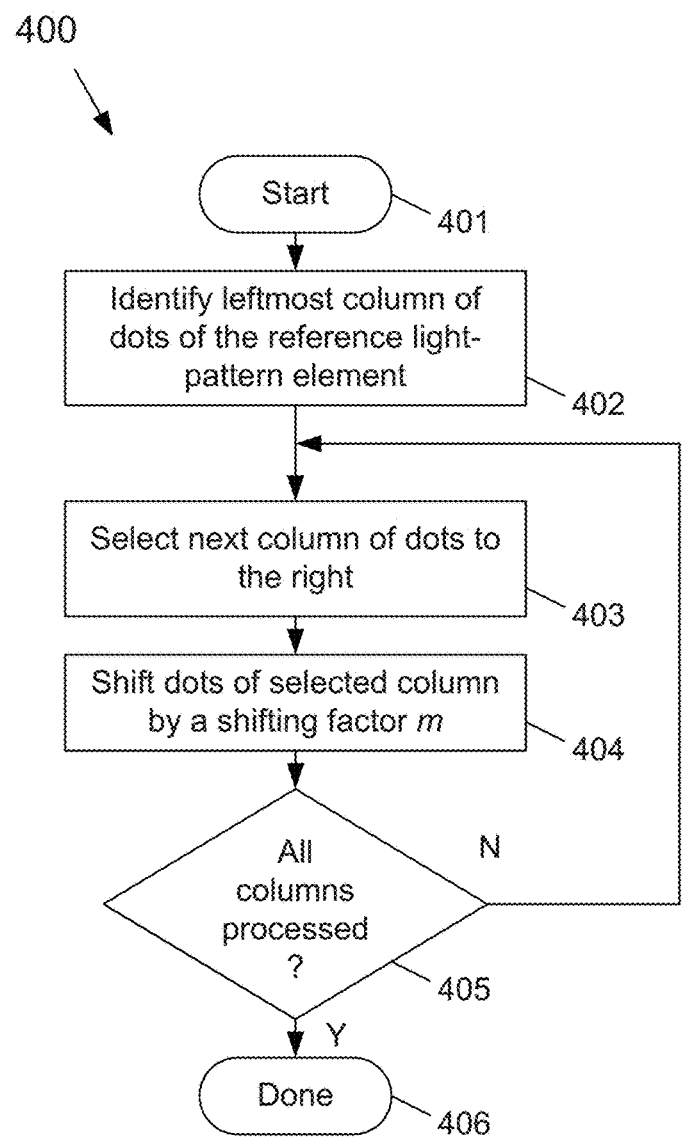
FIG. 4 depicts a flowchart of a process to remap dots of a base light pattern according to the subject matter disclosed herein.

FIG. 4 depicts a flowchart of a process 400 to remap dots of a base light pattern according to the subject matter disclosed herein. The process starts at 401. At 402, the leftmost column of dots of the base light pattern is identified. At 403, the next column of dots to the right is selected. At 404, the dots of the currently selected column are shifted by a shifting factor m. At 405, it is determined whether all of the columns of the base light pattern have been processed. If not, flow returns to 403. If all of the columns of the reference light-pattern have been processed, flow continues to 406 where the process ends. In another embodiment, the process may begin at the rightmost column of dots of the base light pattern and work to the left. Although process 400 in FIG. 4 is described in a specific order (i.e., left to right), it should be understood that the order used to provide dot shift may be arbitrary. That is, each dot may be shifted in an arbitrary order.

Figure 5A:
FIGS. 5A and 5B respectively depict an arrangement of example classification IDs for the sub-patterns of a portion of a typical reference light pattern and an arrangement of example classification IDs for the sub-patterns of a portion of the reference light pattern that has been remapped to form a reference light pattern according to the subject matter disclosed herein.
Figure 5B:

FIGS. 5A and 5B respectively depict an arrangement of example classification IDs for the sub-patterns of a portion of a typical reference light pattern 501 and an arrangement of example classification IDs for the sub-patterns of a portion of the reference light pattern 501 that has been remapped to form a reference light pattern 501' according to the subject matter disclosed herein. More specifically, FIG. 5A depicts the classification IDs of the different sub-patterns forming the typical reference light pattern 501, whereas FIG. 5B depicts the classification IDs of the different sub-patterns for the remapped reference light pattern 501'. The top row of the classification IDs of the light pattern 501 depicted in FIG. 5A has been highlighted in grey to more readily see that the classification IDs have been remapped in the light pattern 501' depicted in FIG. 5B.

Figure 6A:
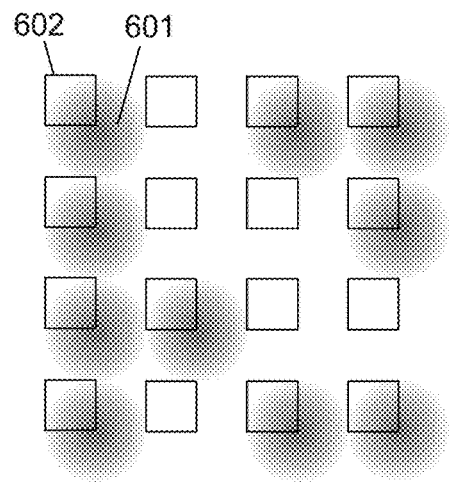
FIGS. 6A-6C depict pixel sampling situations that may occur in practice.
Figure 6B:
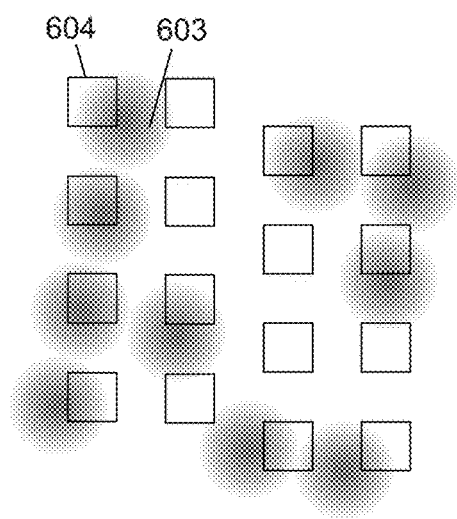
Figure 6C:
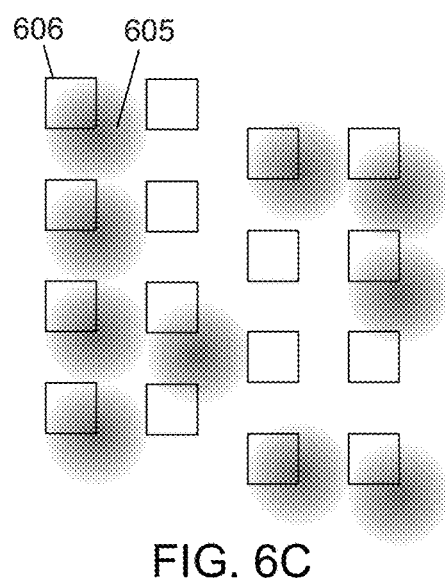

To further illustrate advantages of a reference light pattern that has been remapped according to the subject matter disclosed herein, FIGS. 6A-6C depict pixel sampling situations that may occur in practice. In FIGS. 6A-6C, the dot size is about 2 μm and the pixel size is about 1 μm resulting in a pixel to dot ratio of about 4:1.

In FIG. 6A, dots 601 of an example 4×4 patch of a non-rotated and non-remapped reference light pattern are shown with respect to example sampling pixel locations 602. Although the example sampling pixel locations 602 do not exactly line up with the dots 601, the probability that the classification ID of the example 4×4 patch will be determined is high because the overlap of the sample pixel locations 602 onto the dots 601 is relatively uniform.

In FIG. 6B, dots 603 of an example 4×4 patch of a rotated reference light pattern are shown with respect to example sampling pixel locations 604. The rotation of the reference light pattern causes the overlap of the sample pixel locations 604 onto the dots 603 to not be relatively uniform. Some sample pixel locations 604 will capture more of a dot 602 than other sample pixel locations. Consequently, the resulting 3D image generated from the rotated dots 603 and the sample pixel locations 604 will be relatively noisier and relatively less accurate than the resulting 3D image generated by the dots and the sample pixel locations in FIG. 6A.

In FIG. 6C, dots 605 of an example 4×4 patch of a remapped reference light pattern are shown with respect to example sampling pixel locations 606. The remapping of the dots of the reference light pattern causes the overlap of the sample pixel locations 606 onto the dots 605 to be relatively uniform while also providing an extended disparity. Moreover, instances of collisions are significantly reduced. Consequently, the resulting 3D image generated from the remapped dots 605 and the sample pixel locations 606 will be relatively less noisy and relatively more accurate than the resulting 3D image generated by the rotated dots and the sample pixel locations in FIG. 6B. It should be noted that the sample pixel locations 606 are also remapped to correspond to the remapping of the dots of the reference light pattern.

Figure 7A:
FIGS. 7A and 7B respectfully depict a base light pattern and a reference light-pattern element in which the dots have been stretched in a vertical direction by a stretching factor k.
Figure 7B:
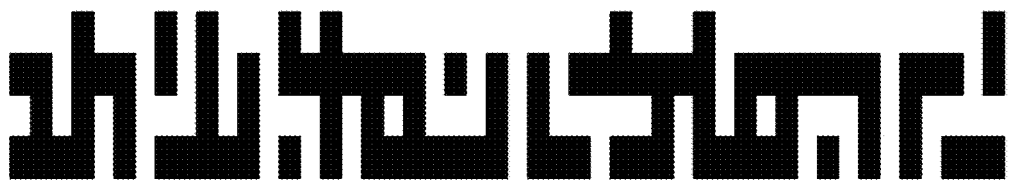

Another embodiment of a base light pattern provides dots that have been stretched in a vertical direction according to the subject matter disclosed herein. FIGS. 7A and 7B respectfully depict the base light pattern 108 and a reference light-pattern element 701 in which the dots have been stretched in a vertical direction by a stretching factor k. By stretching the reference light-pattern element in the vertical direction, the depth estimation becomes more robust to epipolar line violation, and therefore increases system robustness and accuracy.

In one embodiment, the dots of a base light pattern may be stretched in a vertical direction as $$\begin{pmatrix} x' \\ y' \end{pmatrix} = \begin{pmatrix} 1 & 0 \\ 0 & k \end{pmatrix} \begin{pmatrix} x \\ y \end{pmatrix},$$

in which x and y are the original coordinates of the dot in the reference light-pattern element, x' and y' are the new coordinates of the stretched dot in the reference light-pattern element, and k is a stretching factor. The dots of the reference light pattern 701 in FIG. 7B have been stretched by a factor of 2 in comparison to the dots of the reference light pattern 108 in FIG. 7A. A trade-off that may be observed by stretching dots of the based light pattern is that is that the depth image may have a reduced vertical resolution. In that case, the dots may be stretched non-uniformly depending on their location in the reference light pattern. For example, the patterns in the center of the image may be un-stretched, while patterns away from the center may be gradually stretched. The result will be full horizontal/vertical resolution around the center areas, and a reduced vertical resolution towards the boundaries of the image.

Remapping and stretching dots of a base light pattern may be combined as $$\begin{pmatrix} x' \\ y' \end{pmatrix} = \begin{pmatrix} 1 & 0 \\ m & k \end{pmatrix} \begin{pmatrix} x \\ y \end{pmatrix},$$

in which x and y are the original coordinates of the dot in the base light pattern, x' and y' are the new coordinates of the stretched dot in the base light pattern, m is the shifting factor, and k is the stretching factor.

Figure 8:
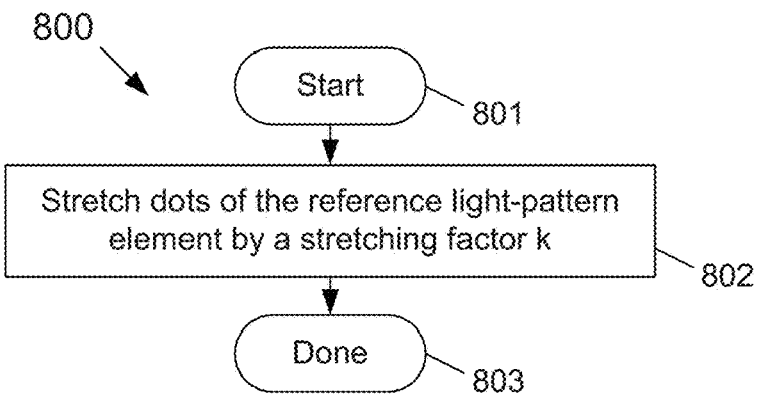
FIG. 8 depicts a flowchart of a process to remap dots of a base light pattern according to the subject matter disclosed herein.

FIG. 8 depicts a flowchart of a process 800 to remap dots of a base light pattern according to the subject matter disclosed herein. The process starts at 801. At 802, all dots of the reference light-pattern element are stretched by a stretching factor k. The process ends at 803.

Figure 9:
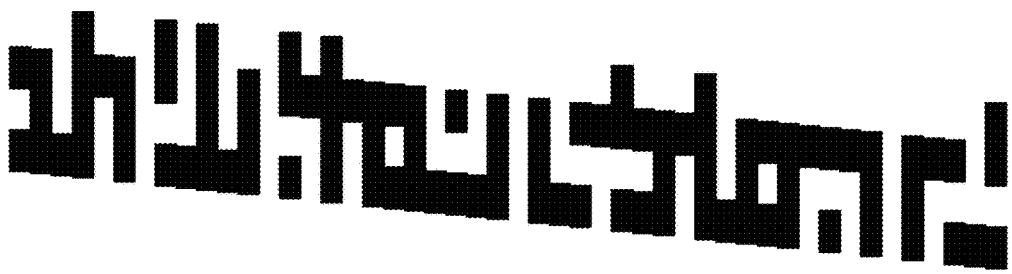
FIG. 9 depicts a base light pattern having dots that have been remapped and stretched according to the subject matter disclosed herein.

FIG. 9 depicts a base light pattern 900 having dots that have been remapped and stretched according to the subject matter disclosed herein. The base light pattern 900 has 48 dots wide in a horizontal direction (i.e., the x direction), and each column is four dots high in a vertical direction (i.e., the y direction) and in which each column of dots has been remapped by a shifting factor m with respect to the column of dot immediately to the left. In the example depicted in FIG. 9, the shifting factor m is 10%, and the stretching factor k is 2.

Figure 10A:
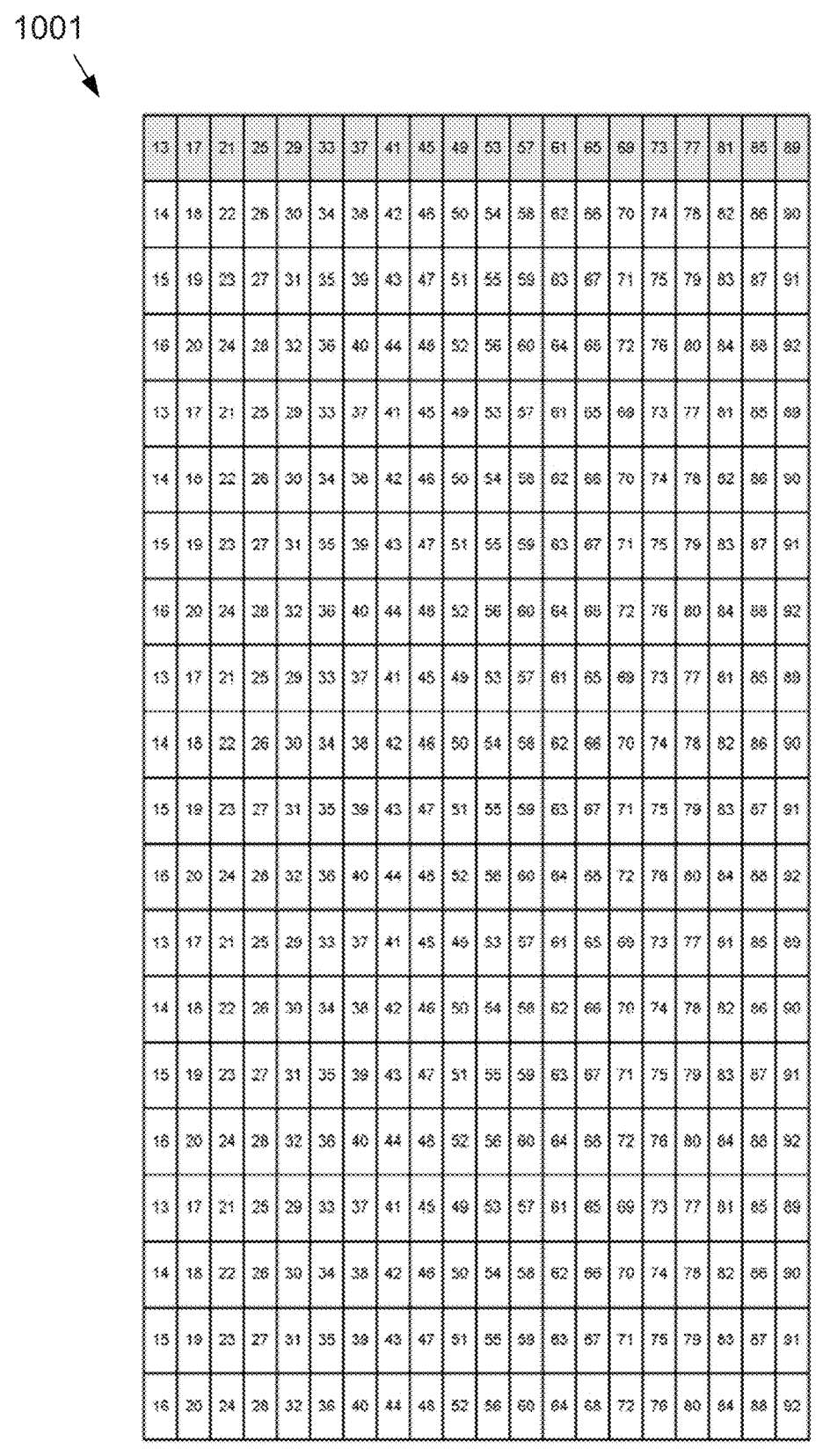
Figure 10B:

FIGS. 10A and 10B respectively depict an arrangement of example classification IDs for sub-patterns of a portion of a stretched reference light pattern 1001 and an arrangement of example classification IDs for sub-patterns of a portion of the reference light pattern 1001 that has been remapped and stretched to form a reference light pattern 1001' according to the subject matter disclosed herein. That is, FIG. 10A depicts the classification IDs of the different sub-patterns forming a reference light pattern 1001 having stretched dots, whereas FIG. 10B depicts the classification IDs of the different sub-patterns for the remapped and stretched reference light pattern 1001'. The top row of the classification IDs of the light pattern 1001 depicted in FIG. 10A has been highlighted in grey to more readily see that the classification IDs have been remapped in the light pattern 1001' depicted in FIG. 10B.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A structured-light system, comprising:
a projector that projects a reference light pattern onto a scene, the reference light pattern comprising a base light pattern comprising a row of a plurality of sub-patterns extending in a first direction, each sub-pattern being adjacent to at least one other sub-pattern, each sub-pattern being different from each other sub-pattern, each sub-pattern comprising n dots in a sub-row and n dots in a sub-column in which n is an integer, each dot comprising substantially a same size, each sub-row extending in the first direction and each sub-column extending in a second direction that is substantially orthogonal to the first direction, sub-columns of each sub-pattern being arranged sequentially from a first sub-column to an $n^{th}$ sub-column, an $i^{th}$ dot in the first sub-column of a sub-pattern being offset a predetermined distance in the second direction from a corresponding $i^{th}$ dot in a second sub-column of the sub-pattern that is adjacent to the first sub-column in which i comprises an integer that is equal to or greater than one and less than or equal to n, and an $i^{th}$ dot in the $n^{th}$ sub-column of the sub-pattern being offset n−1 times the predetermined distance in the second direction from a corresponding $i^{th}$ dot in the first sub-column of the sub-pattern.

2. The structured-light system of claim 1, wherein the plurality of sub-patterns comprises 48 sub-patterns.

3. The structured-light system of claim 2, wherein n comprises 4.

4. The structured-light system of claim 3, wherein a size of each sub-pattern of the base light pattern in the second direction is larger than a size of each sub-pattern in the first direction by a stretching factor.

5. The structured-light system of claim 4, wherein a plurality of structured-light patterns is arranged in a first plurality of columns, each column comprising a second plurality of structured-light patterns.

6. The structured-light system of claim 1, wherein a size of each sub-pattern of the base light pattern in the second direction is larger than a size of each sub-pattern in the first direction by a stretching factor.

7. The structured-light system of claim 6, wherein a plurality of structured-light patterns is arranged in a first plurality of columns, each column comprising a second plurality of structured-light patterns.

8. The structured-light system of claim 1, wherein the reference light pattern further comprises dots of a first sub-pattern of the base light pattern that are aligned in a sub-column at an edge of the first sub-pattern are offset in the second direction from dots of a second sub-pattern of the base light pattern that are aligned in a sub-column at an edge of the second sub-pattern corresponding to the edge of the first sub-pattern.

9. A structured-light system, comprising:
a projector that projects a reference light pattern onto a scene, the reference light pattern comprising a base light pattern comprising a row of a plurality of sub-patterns extending in a first direction, each sub-pattern being adjacent to at least one other sub-pattern, each sub-pattern being different from each other sub-pattern, each sub-pattern comprising n dots in a sub-row and n dots in a sub-column in which n is an integer, each dot comprising substantially a same size, each sub-row extending in the first direction, sub-columns of each sub-pattern being arranged sequentially from a first sub-column to an $n^{th}$ sub-column, each sub-column extending in a second direction that is substantially orthogonal to the first direction, an $i^{th}$ dot in the first sub-column of a sub-pattern being offset a predetermined distance in the second direction from a corresponding $i^{th}$ dot in a second sub-column of the sub-pattern that is adjacent to the first sub-column in which i comprises an integer that is equal to or greater than one and less than or equal to n, an $i^{th}$ dot in the $n^{th}$ sub-column of the sub-pattern being offset n−1 times the predetermined distance in the second direction from a corresponding $i^{th}$ dot in the first sub-column of the sub-pattern, and a size of each sub-pattern of the base light pattern in the second direction being larger than a size of each sub-pattern in the first direction by a stretching factor.

10. The structured-light system of claim 9, wherein a size of a first sub-pattern in the first direction is substantially a same size as a second sub-pattern in the first direction, the first sub-pattern being different from the second sub-pattern.

11. The structured-light system of claim 9, wherein the reference light pattern has been reflected off an object and includes a disparity with respect to a reference structure-light pattern.

12. The structured-light system of claim 9, wherein a plurality of structured-light patterns is arranged in a first plurality of columns, each column comprising a second plurality of structured-light patterns.

13. The structured-light system of claim 9, wherein the stretching factor near a center of the reference light pattern is substantially equal to the stretching factor near an edge of the reference light pattern.

14. The structured-light system of claim 9, wherein the reference light pattern further comprises dots of a first sub-pattern of the base light pattern that are aligned in a sub-column at an edge of the first sub-pattern are offset in the second direction from dots of a second sub-pattern of the base light pattern that are aligned in a sub-column at an edge of the second sub-pattern corresponding to the edge of the first sub-pattern.

* * * * *